United States Patent [19]

Birchall et al.

[11] Patent Number: 5,053,175

[45] Date of Patent: Oct. 1, 1991

[54] PRODUCTION OF FIBRE REINFORCED CERAMIC COMPOSITE

[75] Inventors: James D. Birchall, Mouldsworth; William J. Clegg, Upton, both of England

[73] Assignee: Imperial Chemical Industries PLC, London, England

[21] Appl. No.: 441,606

[22] Filed: Nov. 27, 1989

[30] Foreign Application Priority Data

Dec. 8, 1988 [GB] United Kingdom ............... 8828638

[51] Int. Cl.$^5$ .............................................. C04B 35/71
[52] U.S. Cl. ........................................ 264/60; 501/95
[58] Field of Search ............................. 264/60; 501/95

[56] References Cited

U.S. PATENT DOCUMENTS 4,898,631  2/1990  Collins ................................. 264/60

Primary Examiner—James Derrington
Attorney, Agent, or Firm—Cushman, Darby & Cushman

[57] ABSTRACT

A process for the production of a fibre-reinforced ceramic composite by forming a precursor structure comprising a matrix of a composition comprising particulate ceramic material, liquid diluent and organic binder and fibres within the matrix, in which the fibres are formed from a composition comprising particulate ceramic material, liquid diluent and organic binder, and heating the precursor structure in order to evaporate the liquid diluent, decompose the organic binder and sinter the particles of ceramic material in both the matrix and the fibres. Also, a precursor structure as described. The ceramic composite may have a density of 95% or more of the maximum theoretical density.

16 Claims, No Drawings

PRODUCTION OF FIBRE REINFORCED CERAMIC COMPOSITE

This invention relates to the production of a fibre-reinforced ceramic composite and to a precursor structure from which such a fibre-reinfocred ceramic composite may be produced.

Fibre-reinforced ceramic composites comprising a matrix of sintered particulate material and fibres of a sintered ceramic material distributed through the matrix are a promising class of structural material for use in applications where high strength, high stiffness, low thermal expansion, and high thermal stability are desired, and particularly where high toughness is desired, and many methods have been proposed for the production of such fibre-reinforced ceramic composites. However, the previously proposed methods suffer from disadvantages.

Ideally it would be of considerable benefit if the conventional methods by which sintered ceramic structures are produced could be modified readily in order to incorporate fibres into the structures. Such sintered ceramic structures are conventionally produced by forming a homogeneous composition of a particulate ceramic material, a liquid diluent, and an organic binder, e.g. an organic polymer, in solution or in suspension in the liquid diluent, The composition is formed into a desired shape, for example by compressing the composition in a mould, or by extruding or by injection moulding the composition, the composition is heated to remove the liquid diluent and to burn off the organic binder, and the composition is then heated at a higher temperature in order to sinter together the particles of ceramic material.

It is possible to modify such a conventional production process, for example, by including fibres of a sintered ceramic material in the composition from which the ceramic structure is produced.

However, such a modified production process does suffer from disadvantages. Thus, where a homogeneous composition of particulate ceramic material, liquid diluent, organic binder, and fibres of a sintered ceramic material is formed, for example by use of a bladed mixer or by calendering the composition under conditions of high shear, the fibres may be mechanically damaged. Even where the fibres are not mechanically damaged during the processing, e.g. when a composition is produced by forming layers of fibres and layers of a matrix composition, the presence of fibres in the composition still has a deleterious effect on the processing of the composition and on the properties of the ceramic structure which is produced. Thus, as the composition is processed by heating to elevated temperature the composition tends to contract as the liquid diluent is removed, as the organic binder is burned of, and as the particles of ceramic material are sintered, and the composition also tends to contract as it is cooled from the elevated processing temperature in the final stages of the process. However, there is generally a substantial mismatch between the thermal characteristics of the fibres and rest of the composition as the fibres are already sintered and they do not contract during heating of the composition, and furthermore the fibres in the composition tend to resist the contraction of the composition. The overall result is that cracks form in the matrix of the ceramic composite produced from the fibre-containing composition, the density of the ceramic composite is relatively low, in comparison with the maximum theoretical density, e.g. the density may be as low as 75% and rarely as high as 85% of the maximum theoretical density, and the fibres in the composite tend not to be bonded to the matrix of the composite with the result that the mechanical properties of the composite are adversely affected. Whilst it is possible to overcome to some extent this adverse effect on the mechanical properties of the composite by processing the fibre-containing composition under an applied pressure this is not only inconvenient but use of pressure also places a limitation of the complexity of the shape of the composite which can be produced. Also the resultant composite still may not have mechanical properties, e.g. tensile properties and toughness, or density which are as great as may have been desired.

Other methods have been proposed for producing fibre-reinforced ceramic composites. For example, a three dimensional structure formed of fibres of a ceramic material, e.g. a structure formed of a mat or of a stack of a plurality of mats of fibres of a ceramic material, may be impregnated with a composition of particulate ceramic material, liquid diluent, and organic binder, and the thus impregnated structure may be further processed by heating as hereinbefore described. However, this impregnation process tends to result in production of a composite which has the disadvantageous features hereinbefore referred to as a result of the tendency of the fibres not to contract and to resist contraction of the composition, and furthermore in effecting the impregnation the fibres in the structure tend to filter the particles of ceramic material and it is thus difficult to effect a homogeneous impregnation of the structure with the result that the composite which is produced also has an inhomogeneous composition and variable mechanical properties.

Fibre-reinforced ceramic composites can be produced by a melt infiltration technique in which a structure of a ceramic fibrous material is impregnated with a melt of a ceramic material. However, very high temperatures must necessarily be used and also some ceramic materials sublime rather than melt. Furthermore as a result of the generally high viscosity of melts of ceramic materials the rate of infiltration of the melt into the fibrous structure may be very low and it may be difficult to infiltrate the whole structure homogeneously, and also the fibres of ceramic material may be damaged at the high processing temperature involved in the use of melts of ceramic materials.

A further process by which fibre-reinforced ceramic composites may be produced is &he so-called chemical vapour infiltration process in which a structure formed of fibres of a ceramic material is infiltrated with vapour of a material which can be decomposed to form the matrix of ceramic material in the composite. The process may be operated at relatively low temperature, although generally at a temperature of the order of several hundreds of degrees centigrade, with the result that the damage to the fibres of the ceramic material which may be associated with the melt infiltration process is at least to some extent mitigated. An example of a material which in vapour form may be infiltrated into a structure formed of fibres of a ceramic material is methyltrichlorosilane which may be decomposed to form silicon carbide by heating to a temperature which may be less then 1200° C. For example, a silicon carbide fibrous structure may be infiltrated with the vapour of methyl trichlorosilane and the latter may be thermally decomposed in the fibrous structure to form silicon carbide, the product which is produced in the process being a composite comprising a matrix of silicon carbide reinforced by fibres of silicon carbide. Although the chemical vapour infiltration process does itself overcome some of the disadvantages of processes previously described, for example, the damage to the fibres of ceramic material associated with the melt infiltration process, it is itself a very time-consuming process. Indeed, the processing time involved in the production of a fibre-reinforced composite may be as long as several weeks.

The present invention relates to a process for the production of a fibre-reinforced ceramic composite, that is a composite which comprises a matrix of a ceramic material having fibres of a ceramic material dispersed therein as a reinforcement. The process of the invention is simple to operate in that it is a modification of a conventional process as hereinbefore described in which a structure of sintered particulate ceramic material is produced from a composition comprising a particulate ceramic material, a liquid diluent and an organic binder. However, the modification of the present invention does not suffer from the disadvantages hereinbefore described, particularly the contraction problems associated with the production of a fibre-reinforced ceramic composite from a structure comprising a matrix of particulate ceramic material, liquid diluent and organic binder admixed with fibres of a sintered ceramic material, indeed, the ceramic composite which is produced may have a density 95% or more of the maximum theoretical density. The present invention also provides a precursor structure from which a fibre-reinforced ceramic composite structure may be produced.

The present invention provides a process for the production of a fibre-reinforced ceramic composite by forming a precursor structure comprising a matrix of a composition comprising particulate ceramic material, liquid diluent and organic binder and fibres within the matrix, in which the fibres are formed from a composition comprising particulate ceramic material, liquid diluent and organic binder, and heating the precursor structure in order to evaporate the liquid diluent, decompose the organic binder and sinter the particles of ceramic material in both the matrix and the fibres.

The invention also provides a precursor structure from which such a fibre-reinforced ceramic composite may be produced and which comprises a matrix of a composition comprising particulate ceramic material, liquid diluent and an organic binder and fibres within the matrix which are formed from a composition comprising particulate ceramic material, liquid diluent and organic binder.

In the process by which the fibre-reinforced ceramic composite is produced by heating the precursor structure both the matrix and the fibres contract due in part to loss of liquid diluent and organic binder, and also to sintering of the particles of ceramic material, both in the matrix and in the fibre, with the result that in the fibre-reinforced ceramic composite produced by the process of the invention there is a reduced tendency for cracks to form in the composite and a reduced tendency for the fibres not to be bonded to the matrix when compared with the hitherto described process in which such a composite is produced from a precursor structure comprising a matrix of particulate ceramic material, liquid diluent and organic binder in admixture with fibres of ceramic material which are already sintered and in which there is substantial differential shrinking between the matrix and the fibres.

In the precursor structure from which the fibre-reinforced ceramic composite is produced the particulate ceramic material in the composition from which the matrix is formed may be the same as or different from the particulate ceramic material in the composition from which the fibres are formed. Similarly, the liquid diluent, and the organic binder, in the composition from which the matrix is formed may be the same as or different from the liquid diluent, and the organic binder, in the composition from which the fibres are formed.

The relative proportions of particulate ceramic material, liquid diluent, and organic binder in the compositions from which the matrix and the fibres are produced may be the same or different. However, during heating of the precursor structure to form the fibre reinforced ceramic composite both the matrix and the fibres contract, due in part to loss of liquid diluent and to loss of organic binder from the respective compositions, and also to the sintering of the particles of ceramic material, and it is preferred that the extent of contraction of the matrix and of the fibres caused by loss of liquid diluent and decomposition of organic binder should be substantially the same or at least similar, and for this reason it is preferred that the compositions from which the matrix and the fibres are produced should be substantially the same in respect of the relative proportions of the components therein.

Any particulate ceramic material may be used in the process of the invention. Thus, the particulate ceramic material may be an oxide or a mixture of oxides of a metallic or of a non-metallic element, for example, an oxide of aluminium, calcium, magnesium, silicon, chromium, hafnium, molybdenum, thorium, uranium, titanium or zirconium. The ceramic material may be a carbide of, for example, boron, chromium, hafnium, molybdenum, niobium, tantalum, thorium, titanium, tungsten, uranium, zirconium or vanadium. The ceramic material may be silicon carbide. The ceramic material may be a boride or a nitride, for example, a boride or a nitride of one or more of the elements hereinbefore referred to.

The ceramic material is a material which may be heated to an elevated temperature, e.g. to a temperature in excess of 1000° C., to cause the particles of the material to sinter together. Within the scope of the term particulate ceramic material there is also included those metals which when in a powdered form can be sintered or fused together by application of heat, that is those metals which are susceptible of processing by the technique of powder metallurgy. Suitable metals include aluminium and its alloys, copper and its alloys and nickel and its alloys.

The particulate ceramic material may be a mixture of particles, for example, comprising a mixture of a particulate metal or metals and/or a particulate ceramic non-metallic material or material.

The particles of ceramic material in the compositions from which the matrix and the fibres are produced may have any convenient size, although it is preferred that they are of relatively small size, particularly those in the composition from which the fibre is produced as the fibre itself may be of relatively small diameter and the particles of ceramic material in the composition from which the fibre is produced should have a maximum dimension substantially smaller than the diameter of the fibre.

It is preferred that the particles of ceramic material are of relatively small size, for example a size of less than 5 microns. Particles having a size of less than 1 micron and even less than 0.2 micron are more preferred as the use of such particles enables sintering of the particles of ceramic material to be effected at lower temperatures and at faster rates than would be the case with larger size particles. The particulate ceramic materials may have a mono-modal particle size distribution, that is, the particles may be all of substantially the same size, or the particle size distribution may be multi modal, that is, the particles may comprise a plurality of sizes.

In order that the particulate ceramic material in both the matrix and in the fibre of the precursor structure formed in the process of the invention should sinter in a similar manner, for example at a similar rate at a given temperature, and in order that the matrix and the fibre in the structure should contract at a similar rate on sintering of the particles of ceramic material, it is preferred that the particulate ceramic material in the compositions from which the matrix and the fibre are produced is the same and that the particles have a substantially similar size and size distribution. A similar rate of sintering of the particles of ceramic material in the matrix and in the fibre and a similar rate of contraction of the matrix and the fibre on sintering of the particles has a beneficial effect on the properties of the fibre-reinforced ceramic composite produced in the process of the invention, particularly on the density of the composite.

The liquid diluent may be an organic liquid or it may be an aqueous liquid, e.g. water or a solution of water and an organic liquid. The nature of the liquid diluent will be determined at least in part by the nature of the organic binder in the compositions from which the matrix and fibre are produced. It is desirable that the organic binder be soluble in the liquid diluent and the liquid diluent will be selected accordingly. The liquid diluent may be an alcohol, especially a lower alcohol, e.g. methanol or ethanol, but for reasons of non-toxicity and non-flammability, it is preferably water.

The function of the organic binder in the compositions from which the matrix and the fibres are produced is to bind together the particles of ceramic material in the matrix and in the fibre in the precursor structure produced in the process prior to the particles being sintered in the later heating stages of the process. The binder will generally be an organic polymeric material and it is preferably soluble in the liquid diluent as use of such a soluble polymeric material assists in the successful production of a fibre.

Suitable water soluble organic polymeric materials for use as the binder include
(a) cellulose ethers, for example hydroxypropyl methyl cellulose,
(b) amide-substituted polymers, for example a polymer or copolymer of acrylamide,
(c) polyalkylene oxide derivatives which may be, for example a polyalkylene oxide (alternatively described as a polyalkylene glycol) for example polyalkylene glycols of molecular weight above about 10,000, and
(d) a hydrolysed vinyl acetate polymer or copolymer.

The polymer may be a copolymer of vinyl acetate and a monomer copolymerisable therewith, but it is preferably a hydrolysed poly(vinyl acetate). In order to aid solubility in water the degree of hydrolysis of the vinyl acetate (co)polymer will generally be at least 50%, preferably in the range 70% to 90%.

As the liquid medium and the organic binder must be removed from the matrix and from the fibre in the heating stages of the process it is preferred, in order to avoid excessive shrinkage, that the amounts of liquid medium and organic binder in the compositions from which the matrix and fibre are produced are not excessive, and in particular it is preferred that the compositions contain a high proportion of particulate ceramic material. The compositions preferably comprises greater than 50% by weight of particulate ceramic material, more preferably at least 70% by weight. The compositions may contain as much as 95% by weight of particulate ceramic material.

The proportion of liquid medium in the compositions will generally be greater than 5% by weight but will generally be not more than 25% by weight.

The proportion of organic binder in the compositions, particularly where the binder is an organic polymeric material, will be chosen in part to give to the composition a consistency suitable for shaping, particularly for shaping into a fibre. The compositions will generally contain at least 3% by weight of organic binder but generally not more than 20% by weight.

In order that the particulate ceramic material in both the matrix and in the fibre of the precursor structure formed in the process of the invention should sinter in a similar manner, for example at a similar rate at a given temperature, and in order that the matrix and the fibre in the structure should contract at a similar rate on removal of liquid medium and organic binder therefrom and on sintering of the particles of ceramic material, it is preferred that the proportions of particulate ceramic material, of liquid medium, and of organic binder in the compositions from which the matrix and the fibre are produced should be substantially the same.

The components of the compositions from which matrix and the fibre are produced may be mixed in a similar manner, for example, by mixing in a bladed mixer. However, it is preferred that the components of the compositions are homogeneously mixed and to this end mixing under conditions of high shear is preferred, as in a screw extruder. A preferred form of high shear mixing is that which may be effected on a twin roll mill the rolls of which may be operated at the same or different peripheral speeds. The compositions may be passed repeatedly through the nip between rolls of the mill, which nip may be progressively decreased in size. The nip between the rolls of the mill may be decreased to a size as low as 0.1 mm with the result that very high shear may be applied to the compositions which assists in breaking down aggregates of particulate ceramic material which may be present in the compositions and in the production of a homogeneously mixed composition.

The fibre which forms part of the precursor structure of the invention may be formed by extruding a composition through a suitable orifice. The composition will have a consistency such that when the composition is extruded in fibrous form the fibre is able to maintain its integrity. The fibre may be extruded as a continuous filament, or it may be chopped into the form of relatively short fibres. The fibre may be converted into the form of a mat, for example, by weaving of the fibre.

The fibre may be of any suitable diameter. It will generally have a diameter of at least 50 microns, and it may have a diameter of as much as 500 microns or even 1 mm or greater. No particular limitation needs to be placed on the fibre diameter.

In order to assist in maintaining the integrity of the fibre during formation of the precursor structure, and during heating of the structure to produce the fibre-reinforced ceramic composite, the fibre may be coated with a material which is resistant to the elevated temperatures encountered in the heating stages of the process, for example, which is resistant to elevated temperatures of 1000° C. or more. A suitable coating for the fibre is carbon, which may be applied to the surface of the fibre by evaporation or by contacting the fibre with a dispersion of carbon in a liquid medium. The fibre may be coated with the decomposible precursor of a material which is resistant to elevated temperatures, for example, with a decomposible precursor of a refractory boride.

Although the precursor structure may be formed by a variety of different techniques certain techniques by which fibre-reinforced structures may be formed in other arts e.g. in the fibre reinforced plastics art, may prove to be unsuitable. Thus mixing of a matrix-forming composition with fibres in a bladed mixer, and particularly mixing of a matrix-forming composition with fibres under conditions of high shear, e.g. in an extruder or on a twin roll mill, may tend to destroy the integrity of the fibres with the result that the desired fibrous reinforcement of the ceramic composite produced in the process may not be achieved.

The precursor structure is desirably formed by methods which do not result in destruction of the integrity of the fibres. For example, the composition from which the matrix is produced may be in the form of a sheet, and fibres, which may be in the form of relatively short chopped fibres or in the form of a mat which may be woven or unwoven, or in other forms, may be placed on the sheet and optionally pressed into the sheet.

A precursor structure may be built up by forming a plurality of alternating layers of a composition from which the matrix is produced and a layer of fibres and pressing the structure.

The precursor structure may be formed by other methods and the process of the invention is not limited to use of a particular method of forming the precursor structure. For example, the precursor structure may be formed by pressing a mass of fibres which has been coated with the composition from which the matrix is produced.

In the subsequent stages of the process of the invention the precursor structure is heated in order to evaporate the liquid diluent, decompose the organic binder, and sinter the particles of ceramic material in both the matrix and the fibre.

The precursor structure need be heated at only a relatively low temperature in order to evaporate the liquid medium, a temperature of up to 100° C. or possibly slightly higher generally sufficing, although the temperature to be used will depend to some extent on the nature of the liquid medium.

Similarly, the nature of the organic binder will determine at least to some extent the temperature to which the precursor structure should be heated in order to decompose the binder and remove the binder from the structure. In general a temperature of up to 500° C. may suffice, although a higher temperature may be used e.g. a temperature of up to 750° C.

Similarly, the temperature at which sintering of the particles of ceramic material in the matrix and in the fibre may be effected will also depend at least to some extent on the nature of the ceramic material and on the form of the ceramic material, e.g. the particle size and the particle size distribution. The temperature at which sintering may be effected will generally be at least 1000° C. and it may even be up to a temperature of 2000° C. or greater.

Although in the aforementioned description specific temperatures have been referred to at which to remove the liquid diluent and decompose the organic binder, and sinter the particles of ceramic material, these process steps may be effected by heating the precursor structure gradually t progressively higher temperatures, with the temperature possibly being maintained at a particular temperature or temperatures for a specific period of time during the heating to progressively higher temperatures.

In order to avoid undesirable oxidation it may be necessary to effect some at least of the heating in a non-oxidising atmosphere, e.g. in an atmosphere of an inert gas. Use of such an atmosphere may be particularly desirable at the higher temperatures.

The invention is illustrated by the following examples in which all parts are expressed as parts by weight.

EXAMPLE 1

Production of fibre. A composition of 49.5 parts of silicon carbide powder having a particle size of 0.2 micron, 0.5 parts of boron powder, 4.5 parts of hydrolysed polyvinyl acetate having a degree of hydrolysis of 80% and 9 parts of water were mixed on a twin roll mill and formed into a band on the mill. The band was repeatedly removed from the mill and re-inserted through the nip between the rolls of the mill in order to mix the components of the composition thoroughly. The composition was then charged to a screw extruder and extruded in a fibrous form through a 300 micron diameter die on the extruder.

Production of matrix. A composition which was the same as that described above, except that the composition contained 5 parts of hydrolysed polyvinyl acetate, was mixed on a twin roll mill following the above described procedure and the resultant sheet was removed from the mill. The sheet, which had a thickness of 0.2 mm, was cut into two equal sized parts.

Production of precursor structure. Fibres produced as described above were chopped to a length of approximately 80 mm and placed on the surface of one of the sheets and the other sheet was then placed on top of the fibres and the thus formed structure was pressed under an applied pressure of 4 tons.

The production of ceramic composite. The precursor structure was then heated at 80° C. for 12 hrs, and thereafter the temperature was raised at 1° C. per minute to 700° C. and the structure was heated at 700° C. for 1 hr in an atmosphere of argon. The temperature was then raised at a rate of 15° C. per minute to 2050° C. and heating at 2040° C. was continued for ½ hr. The thus formed fibre reinforced ceramic composite was then cooled to ambient temperature. The density of the composite was 98% of the maximum theoretical density and examination by optical and electron microscopy showed that the composite was free of cracks and that the fibre integrity had been maintained.

COMPARATIVE EXAMPLE 1

Production of fibre. The fibre production process as described in Example 1 above was repeated except that the fibre which was produced was additionally heated to 2040° C. at a rate of temperature increase of 15° C. per minute and the temperature was held at 2040° C. for 30 minutes. The fibre of sintered silicon carbide which was produced was then coated with a thin layer of carbon by evaporation.

Production of matrix. Two 0.2 mm thick sheets were produced following the procedure described in Example 1 above.

Production of precursor structure. A precursor structure was produced following the procedure described in Example 1 above.

Production of ceramic composite. The precursor structure was heated following the procedure described in Example 1 above. However, the final density of the composite was only 81% of the maximum theoretical density and optical examination of the composite indicated that the composite contained substantial porosity mainly present as large cracks transverse to the direction of the fibres.

COMPARATIVE EXAMPLE 1a

The procedure of Comparative Example 1 above was repeated except that the precursor structure was produced by pressing the fibres into a surface of one of the matrix sheets.

The final density of the resultant ceramic composite was 87% of the theoretical maximum density and the composite contained large cracks transverse to the direction of the fibres. Furthermore, the sheet was no longer planar and the face of the sheet containing the fibres was curved.

EXAMPLE 2

Production of fibre. The procedure of Example 1 above was followed to produce a fibre except that the fibre was produced from a composition of 50 parts of titanium diboride having a mean particle size of 1 micron and 11 parts of a 20:80 w:w solution of hydroxy propyl methyl cellulose and water, the fibre was extruded through a 500 micron diameter die, and the fibre after drying was coated with a layer of carbon by dipping in a carbon slurry.

Production of matrix. Two 0.2 mm thick sheets were produced following the procedure of Example 1 above except that the sheets were produced from a titanium diboride-containing composition as described above.

Production of precursor structure. The procedure described in Example 1 above was followed to produce a precursor structure from the titanium diboride-containing fibres and matrix produced as described above.

Production of ceramic composite. A ceramic composite was produced from the precursor structure following the hearing procedure described in Example 1. The density of the composite was 94% of the theoretical maximum density. The integrity of the fibres had been maintained in the composite and the composite was free from cracks.

COMPARATIVE EXAMPLES 2

The procedure of Example 2 was followed to produce a ceramic composite except that the composite was produced from a precursor structure in which the fibres which were present were titanium diboride fibres produced as described above which, prior to being coated with carbon, had been heated to 2040° C. at a rate of temperature increase of 15° C. per minute and held at this temperature for 30 minutes in order to sinter the titanium diboride particles in the fibre. The fibre had a density of 93% of the theoretical maximum. The ceramic composite which was produced had a density of only 81% of the theoretical maximum density and contained large cracks transverse to the direction of the fibres.

EXAMPLE 3

Production of fibre The procedure of Example 1 above was followed to produce a fibre except that the fibre was produced from a composition of 50 parts of titanium carbide having a mean particle size of 1.45 micron, 5 parts of 80% hydrolysed polyvinyl acetate, 6 parts of water, and the fibre after drying was coated with a layer of carbon by dipping in a carbon slurry.

Production of matrix. Two 0.2 mm thick sheets were produced following the procedure of Example 1 above except that the sheets were produced from a titanium carbide-containing composition as described above.

Production of precursor structure. The procedure described in Example 1 above was followed to produce a precursor structure from the titanium carbide-containing fibres and matrix produced as described above.

Production of ceramic composite. A ceramic composite was produced from the precursor structure following the heating procedure described in Example 1. The density of the composite was 96% of the theoretical maximum density. The integrity of the fibres had been maintained in the composite and the composite was free from cracks.

COMPARATIVE EXAMPLE 3

The procedure of Example 3 was followed to produce a ceramic composite except that the composite was produced from a precursor structure in which the fibres which were present were titanium carbide fibres produced as described above which, prior to being coated with carbon, had been heated to 2040° C. at a rate of temperature increase of 15° C. per minute and held at this temperature for 30 minutes in order to sinter the titanium carbide particles in the fibre. The fibre had a density of 94% of the theoretical maximum. The ceramic composite which was produced had a density of only 83% of the theoretical maximum density and contained large cracks transverse to the direction of the fibres.

EXAMPLE 4

Production of fibre. The procedure of Example 1 above was followed to produce a fibre except that the fibre was produced from a composition of 50 parts of titanium dioxide having a mean particle size of 0.2 micron, 5 parts of 80% hydrolysed polyvinyl acetate, and 6 parts of water, the fibre was extruded through a 200 micron diameter die, and the fibre after drying was coated with a layer of boron nitride by dipping in a boron nitride slurry.

Production of matrix. Two 0.2 mm thick sheets were produced following the procedure of Example 1 above except that the sheets were produced from a titanium dioxide-containing composition as described above.

Production of precursor structure. The procedure described in Example 1 above was followed to produce a precursor structure from the titanium dioxide-containing fibres and matrix produced as described above.

Production of ceramic composite. A ceramic composite was produced from the precursor structure following the heating procedure described in Example 1 except that the maximum temperature was 1200° C. The density of the composite was 98% of the theoretical maximum density. The integrity of the fibres had been maintained in the composite and the composite was free from cracks.

COMPARATIVE EXAMPLE 4

The procedure of Example 4 was followed to produce a ceramic composite except that the composite was produced from a precursor structure in which the fibres which were present were titanium dioxide fibres produced as described above which, prior to being coated with boron nitride, had been heated to 1200° C. at a rate of temperature increase of 15° C. per minute and held at this temperature for 30 minutes in order to sinter the titanium dioxide particles in the fibre. The fibre had a density of 99% of the theoretical maximum. The ceramic composite which was produced was found to be broken into several pieces.

EXAMPLE 5

Production of fibre. The procedure of Example 1 above was followed to produce a fibre except that the fibre was produced from a composition of 50 parts of zirconium dioxide powder, 4 parts of 80% hydrolysed polyvinyl acetate and 6 parts of water, the fibre was extruded through a 200 micron diameter die, and the fibre after drying was coated with a layer of boron nitride by dipping in a boron nitride slurry.

Production of matrix. Two 0.2 mm thick sheets were produced following the procedure of Example 1 above except that the sheets were produced from a zirconium dioxide-containing composition as described above.

Production of precursor structure. The procedure described in Example 1 above was followed to produce a precursor structure from the zirconium dioxide-containing fibres and matrix produced as described above.

Production of ceramic composite. A ceramic composite was produced from the precursor structure following the heating procedure described in Example 1 except that the maximum temperature was 1450° C. The density of the composite was 99.5% of the theoretical maximum density. The integrity of the fibres had been maintained in the composite and the composite was free from cracks.

COMPARATIVE EXAMPLE 5

The procedure of Example 5 was followed to produce a ceramic composite except that the composite was produced from a precursor structure in which the fibres which were present were zirconium dioxide fibres produced as described above which, prior to being coated with boron nitride, had been heated at a rate of temperature increase of 15° C. per minute to 1450° C. and held at this temperature for 30 minutes in order to sinter the zirconium dioxide particles in the fibre. The fibre had a density of 99.8% of the theoretical. The ceramic composite which was produced had a density of only 81.4% of the theoretical maximum density and contained large cracks transverse to the direction of the fibres.

EXAMPLE 6

Production of fibre. The procedure of Example 5 was followed to produce a boron nitride-coated zirconium dioxide containing fibre.

Production of matrix. Two 0.2 mm thick sheets were produced following the procedure of Example 1 above except that the sheets were produced from a composition of 50 parts of aluminium oxide powder, 5 parts of 80% hydrolysed polyvinyl acetate, and 7 parts of water.

Production of precursor structure. The procedure described in Example 1 above was followed to produce a precursor structure from the fibres and matrix produced as described above.

Production of ceramic composite. A ceramic composite was produced from the precursor structure following the heating procedure described in Example 1 except that the maximum temperature was 1450° C. The density of the composite was 99.2% of the theoretical maximum density. The integrity of the fibres had been maintained in the composite and the composite was free from cracks.

COMPARATIVE EXAMPLE 6

The procedure of Example 6 was followed to produce a ceramic composite except that the composite was produced from a precursor structure in which the fibres which were present were sintered zirconium dioxide fibres produced following the procedure of comparative example 5. The ceramic composite which was produced has a density of only 81% of the theoretical maximum density and contained large cracks transverse to the direction of the fibres.

We claim:

1. A process for the production of a fibre-reinforced ceramic composite by forming a precursor structure comprising a matrix of a composition comprising particulate ceramic material, liquid diluent and organic binder and fibres within the matrix, in which the fibres are formed from a composition comprising particulate ceramic material, liquid diluent and organic binder, and heating the precursor in order to evaporate the liquid diluent, decompose the organic binder and sinter the particles of ceramic material in both the matrix and the fibres.

2. A process as claimed in claim 1 in which the particulate ceramic material in the composition of the matrix is the same as the particulate ceramic material in the composition of the fibres.

3. A process as claimed in claim 1 in which the extent of contraction of the matrix and of the fibres caused by loss of liquid diluent and decomposition of organic binder is substantially the same.

4. A process as claimed in claim 3 in which the proportions of the components in the compositions from which the matrix and the fibre are produced are substantially the same.

5. A process as claimed in any one of claims 1 to 4 in which the particulate ceramic material is selected from the group consisting of silicon carbide, titanium carbide, titanium diboride, titanium dioxide and zirconium dioxide.

6. A process as claimed in any one of claims 1 to 4 in which the particle size of the ceramic material is less than 5 microns.

7. A process as claimed in any one of claims 1 to 4 in which the organic binder is an organic polymeric material.

8. A process as claimed in claim 7 in which the organic polymeric material comprises a hydrolysed vinyl acetate polymer or copolymer.

9. A process as claimed in any one of claims 1 to 4 in which the compositions from which the matrix and the fibre are produced comprise at least 50% by weight of particulate ceramic material.

10. A process as claimed in any one of claims 1 to 4 in which the compositions from which the matrix and the fibre are produced comprise greater than 5% by weight of liquid medium.

11. A process as claimed in any one of claims 1 to 4 in which the compositions from which the matrix and the fibre are produced comprise at least 3% by weight of organic binder.

12. A process as claimed in any one of claims 1 to 4 in which the fibre has a diameter of at least 50 microns.

13. A process as claimed in any one of claims 1 to 4 in which the fibre is coated with a material which is resistant to the elevated temperature encountered in the heating stage of the process.

14. A process as claimed in claim 13 in which the resistant material is carbon.

15. A process as claimed in any one of claims 1 to 4 in which the precursor structure comprises a matrix in the form of a sheet having fibres pressed into the sheet.

16. A process as claimed in claim 15 in which the precursor structure comprises alternating layers of a composition from which the matrix is produced and layers of fibres.

* * * * *